(12) United States Patent
Tsuduki

(10) Patent No.: US 11,120,680 B1
(45) Date of Patent: Sep. 14, 2021

(54) ALARM GENERATION SYSTEM AND ALARM GENERATION METHOD

(71) Applicant: YOKOGAWA ELECTRIC CORPORATION, Musashino (JP)

(72) Inventor: Jun Tsuduki, Musashino (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/158,518

(22) Filed: Jan. 26, 2021

(30) Foreign Application Priority Data

Mar. 12, 2020 (JP) .............................. JP2020-042940

(51) Int. Cl.
*G08B 21/18* (2006.01)
(52) U.S. Cl.
CPC .................................. *G08B 21/182* (2013.01)
(58) Field of Classification Search
CPC .................................................. G08B 21/182
USPC .......................................................... 340/540
See application file for complete search history.

(56) References Cited

U.S. PATENT DOCUMENTS

| | | | |
|---|---|---|---|
| 2005/0125403 A1* | 6/2005 | Wakabayashi | G08B 21/0423 |
| 2014/0266670 A1* | 9/2014 | Krishnamoorthy | G08B 25/14 340/501 |
| 2019/0101908 A1* | 4/2019 | Park | G08B 21/18 |
| 2019/0104951 A1* | 4/2019 | Valys | G16H 50/30 |
| 2019/0130720 A1* | 5/2019 | Lui | G06K 9/66 |
| 2019/0306011 A1* | 10/2019 | Fenoglio | H04L 41/22 |
| 2019/0391573 A1* | 12/2019 | Wang | G05B 13/027 |
| 2020/0267179 A1* | 8/2020 | Ramasamy | G06N 20/20 |

FOREIGN PATENT DOCUMENTS

JP          2010-71837 A      4/2010

* cited by examiner

*Primary Examiner* — Ojiako K Nwugo
(74) *Attorney, Agent, or Firm* — Westerman, Hattori, Daniels & Adrian, LLP

(57) ABSTRACT

An alarm generation system includes: an acquisition unit that acquires a measured value obtained from a sensor; a learning unit that generates a learning model through learning of the measured value acquired by the acquisition unit; a prediction unit that obtains, by using the learning model generated by the learning unit, a predicted measured value that is a measured value to be obtained in a future from a current time point; and an alarm generation unit that generates an alarm when the predicted measured value obtained by the prediction unit satisfies an alarm generation condition.

20 Claims, 10 Drawing Sheets

FIG. 13

| ALARM | SENSOR INSTALLATION POSITION | ALARM GENERATION CONDITION | GENERATION TIME |
|---|---|---|---|
| ON | FACTORY A-THERMOSTAT OVEN 00453 | EXCEEDING UPPER LIMIT | IN 15 MINUTES |
| ON | FACTORY C-THERMOSTAT OVEN 02450 | EXCEEDING CHANGE-VALUE UPPER LIMIT | IN 3 MINUTES |
| ON | FACTORY A-THERMOSTAT OVEN 00245 | EXCEEDING UPPER LIMIT | IN 10 MINUTES |
| ON | FACTORY B-THERMOSTAT OVEN 11945 | BECOMING LESS THAN LOWER LIMIT | IN 35 MINUTES |
| ... | | | |

(0004/0004)
◀ ▶
UP DOWN

ALARM GENERATION SYSTEM AND ALARM GENERATION METHOD

CROSS REFERENCES TO RELATED APPLICATIONS

The present application claims priority under 35 U.S.C. § 119 to Japanese Patent Application No. 2020-042940, filed Mar. 12, 2020. The contents of this application are incorporated herein by reference in their entirety.

TECHNICAL FIELD

The present disclosure relates to an alarm generation system and an alarm generation method.

BACKGROUND

Typically, a paperless recorder is an apparatus that records measured values of various sensors as measurement data and displays the recorded measurement data. Many paperless recorders of this type include a liquid crystal display touchscreen and are configured to be capable of changing details of the measurement data displayed on the liquid crystal display in accordance with a user operation performed on the touchscreen.

In addition, in recent years, some paperless recorders include an alarm function of giving an alarm when a measured value satisfies a predetermined condition (e.g., when the measured value exceeds a preset threshold). The alarm is given by, for example, being displayed on a liquid crystal display or being transmitted by email. Japanese Unexamined Patent Application Publication No. 2010-71837 discloses a paperless recorder that displays information about an alarm generation condition with the highest degree of importance in a plurality of alarm generation conditions.

SUMMARY

By a waveform displayed on a paperless recorder or an alarm given by a paperless recorder, a user may be too late to determine an abnormality. For example, in a product manufacturing process, if an operator finds an alarm or an abnormality in a waveform displayed on a paperless recorder and then responds the abnormality, the manufacturing process may depart from a normal state to be in a situation in which a defective product is manufactured.

To prevent such a situation, if the condition on which the paperless recorder gives an alarm is made less strict, the alarm becomes less accurate. For example, an alarm may be given despite no abnormality in the manufacturing process.

Thus, it is desirable to provide an alarm generation system and an alarm generation method that can notify a user that an abnormality may occur in the future.

To address the above issue, an alarm generation system according to an aspect of the present disclosure includes: an acquisition unit that acquires a measured value obtained from a sensor; a learning unit that generates a learning model through learning of the measured value acquired by the acquisition unit; a prediction unit that obtains, by using the learning model generated by the learning unit, a predicted measured value that is a measured value to be obtained in a future from a current time point; and an alarm generation unit that generates an alarm when the predicted measured value obtained by the prediction unit satisfies an alarm generation condition.

The alarm generation system according to the aspect of the present disclosure may further include: a creation unit that, if the predicted measured value obtained by the prediction unit satisfies the alarm generation condition, creates information for notifying a user that the alarm is generated.

The alarm generation system according to the aspect of the present disclosure may further include: a display unit that displays at least one of the predicted measured value obtained by the prediction unit and a time at which the predicted measured value satisfies the alarm generation condition.

In the alarm generation system according to the aspect of the present disclosure, the prediction unit may further obtain information indicating a probability of generating the alarm by using the learning model generated by the learning unit, and the display unit may further display information indicating the probability of generating the alarm obtained by the prediction unit.

In the alarm generation system according to the aspect of the present disclosure, the alarm generation condition may be at least one of the predicted measured value exceeding an upper limit, the predicted measured value becoming less than a lower limit, a change value of the predicted measured value exceeding a change-value upper limit, and the change value of the predicted measured value becoming less than a change-value lower limit.

An alarm generation method performed by an alarm generation system according to an aspect of the present disclosure includes: acquiring a measured value obtained from a sensor; generating a learning model through learning of the acquired measured value; obtaining, by using the generated learning model, a predicted measured value that is a measured value to be obtained in a future from a current time point; and generating an alarm when the predicted measured value satisfies an alarm generation condition.

The present disclosure, for example, produces an effect of notifying a user that an abnormality may occur in the future.

BRIEF DESCRIPTION OF THE DRAWINGS

FIG. 13 illustrates a display example of alarm details information in the embodiment of the present disclosure.

DESCRIPTION OF THE PREFERRED EMBODIMENTS

Now, an alarm generation system and an alarm generation method according to an embodiment of the present disclosure will be described below with reference to the drawings. Note that the following embodiment is an example in which the alarm generation system is applied to a recorder system. The recorder system herein is a system that records measured values of various sensors as measurement data and displays the recorded measurement data.

Embodiment

Recorder System

Figure 1:
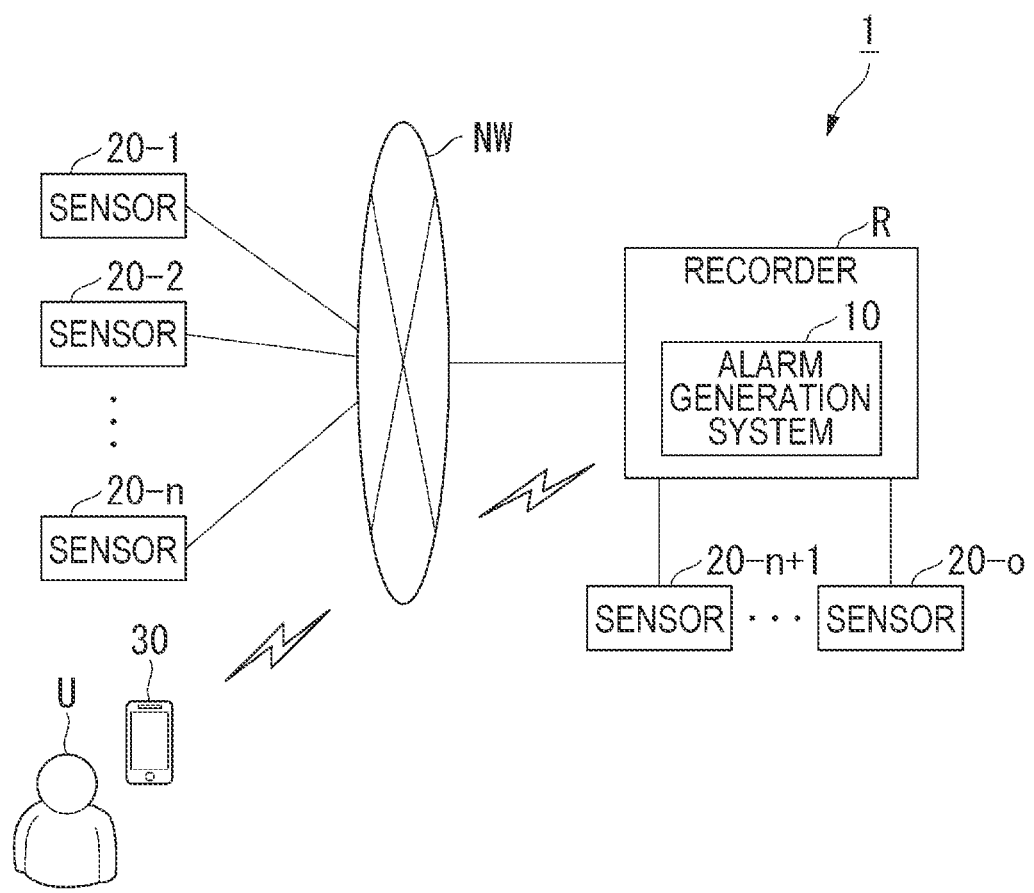
FIG. 1 is a block diagram illustrating an overall configuration of a recorder system according to an embodiment of the present disclosure.

FIG. 1 is a block diagram illustrating an overall configuration of a recorder system according to an embodiment of the present disclosure. As illustrated in FIG. 1, a recorder system 1 includes sensors 20-1 to 20-n (n is an integer satisfying n>0), a recorder R, and a terminal apparatus 30. The sensors 20-1 to 20-n, the recorder R, and the terminal apparatus 30 are communicably connected to one another via a network NW. The recorder system 1 further includes sensors 20-n+1 to 20-o (o is an integer satisfying o≥n) that are directly connected to the recorder R. The network NW includes, for example, the Internet, a wide area network (WAN), a local area network (LAN), a provider apparatus, a wireless base station, and the like.

The sensors 20-1 to 20-o are, for example, pressure sensors, pH sensors, vibration sensors, temperature sensors, flowrate sensors, corrosion sensors, distortion sensors, noise sensors, gas sensors, voltage sensors, current sensors, level sensors, and the like. The sensors 20-1 to 20-n acquire measured values of a measurement target and transmit the acquired measured values together with identification information (sensor IDs) as measurement information to the recorder R. The sensors 20-n+1 to 20-o acquire measured values of a measurement target and output information indicating the acquired measured values to the recorder R.

The recorder R records the measurement information transmitted from the sensors 20-1 to 20-n via the network NW and displays the recorded measurement information. In addition, a module (e.g., for voltage, current, proportional integral derivation (PID), pulse, digital input/output, or analog input/output) can be connected to the back of the recorder R. By wiring the sensors 20-n+1 to 20-o directly to the back of the recorder R, the recorder R can record information indicating the measured values output from the sensors 20-n+1 to 20-o and display the recorded measurement information. The recorder R includes an alarm generation system 10. The alarm generation system 10 obtains a predicted measured value that is a measured value to be obtained in the future from the current time point, and, if the predicted measured value satisfies an alarm generation condition, creates information for notifying a user U that an alarm is generated. The alarm generation system 10 also displays at least one of the obtained predicted measured value and a time at which the predicted measured value satisfies the alarm generation condition. Herein, the time at which the predicted measured value satisfies the alarm generation condition is based on the predicted measured value. Note that details of the alarm generation system 10 will be described later.

The terminal apparatus 30 is a terminal for receiving information sent from the alarm generation system 10 (e.g., information transmitted by email, the information for notifying the user U that an alarm is generated) and for informing the user U of the information. For example, the terminal apparatus 30 is a portable computer, such as a laptop or a tablet, a personal digital assistant (PDA), a smartphone, or the like. Alternatively, the terminal apparatus 30 may be stationary.

Alarm Generation System

Figure 2:
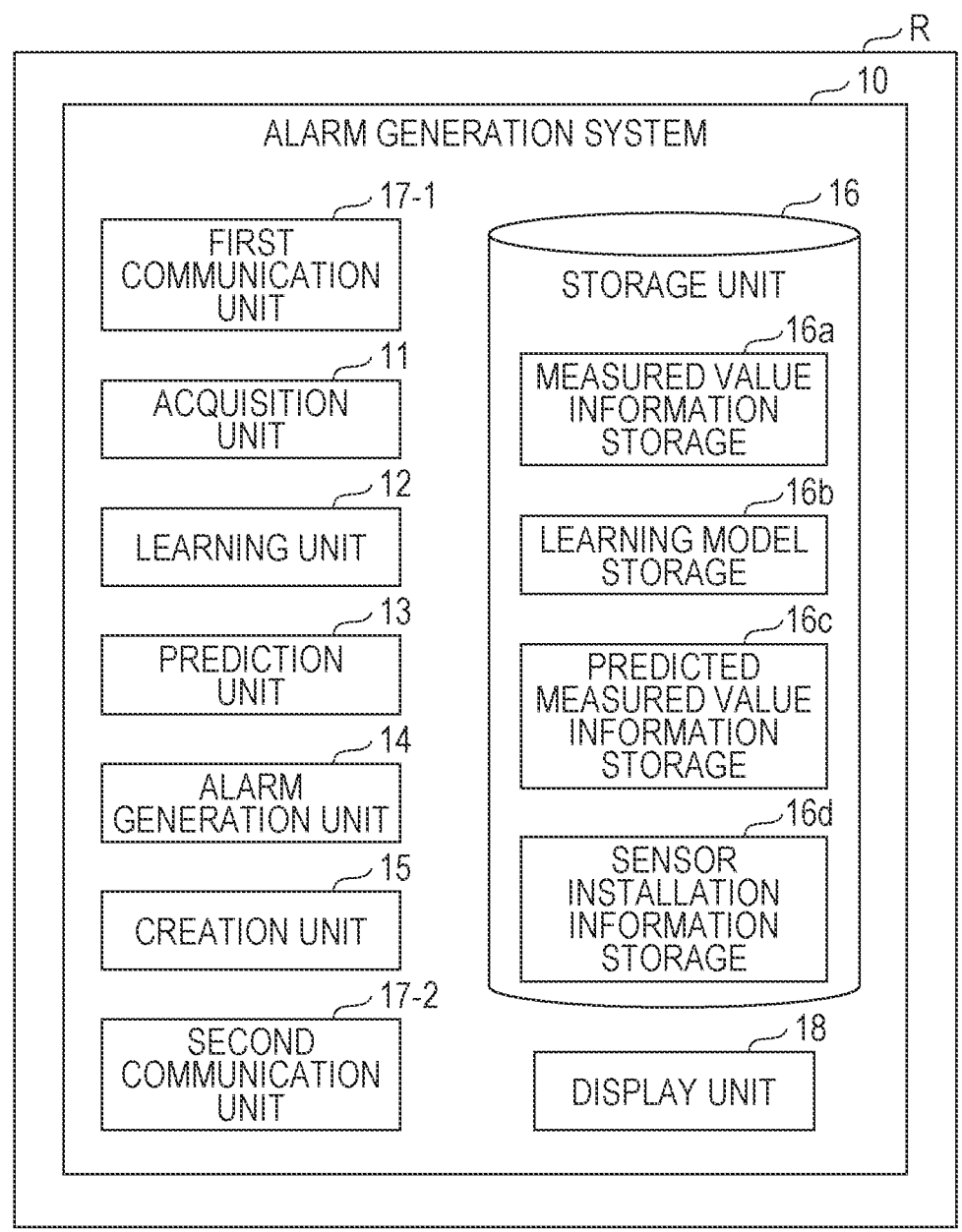
FIG. 2 is a block diagram illustrating key components of an alarm generation system according to the embodiment of the present disclosure.

FIG. 2 is a block diagram illustrating key components of the alarm generation system 10 according to the embodiment of the present disclosure. As illustrated in FIG. 2, the alarm generation system 10 includes an acquisition unit 11, a learning unit 12, a prediction unit 13, an alarm generation unit 14, a creation unit 15, a storage unit 16, a first communication unit 17-1, a second communication unit 17-2, and a display unit 18.

The first communication unit 17-1 communicates with external apparatuses such as the sensors 20-1 to 20-n connected to the network NW and transmits or receives data. The first communication unit 17-1 is, for example, connected to the network NW with a wire. The first communication unit 17-1 may alternatively be connected to the network NW wirelessly. The first communication unit 17-1 receives the measurement information output from each of the sensors 20-1 to 20-n. Note that the measurement information includes identification information (sensor ID) of each of the sensors 20-1 to 20-n and information indicating a measured value.

The acquisition unit 11 acquires the measurement information received by the first communication unit 17-1. The acquisition unit 11 acquires, from a clock (omitted from illustration) included in the alarm generation system 10, information on the date and time on and at which the measurement information is acquired (this information is referred to as date-and-time information). The acquisition unit 11 stores the measurement information (the sensor ID and the information indicating the measured value) and the acquired date-and-time information in a measured value information storage 16a in the storage unit 16 association with each other. The acquisition unit 11 also acquires information indicating a measured value output from each of the sensors 20-n+1 to 20-o. The acquisition unit 11 acquires, from the clock (omitted from illustration) included in the alarm generation system 10, information on the date and time on and at which the information indicating the measured value is acquired (this information is referred to as date-and-time information). The acquisition unit 11 stores the information indicating the measured value, the sensor ID of the sensor that outputs the information indicating the measured value, and the acquired date-and-time information in the measured value information storage 16a in the storage unit 16 in association with one another.

The learning unit 12 learns a relationship between a plurality of measured values and date-and-time information of the measured values for each sensor ID by using the measured value information storage 16a in the storage unit 16. Each time new measurement information and date-and-time information are stored in the measured value information storage 16a, the learning unit 12 may learn the relationship for each sensor ID. Alternatively, in a predetermined cycle of a minute, an hour, a day, or the like, the learning unit 12 may learn the relationship for each sensor ID. The learning unit 12 stores a learning model obtained through learning in a learning model storage 16b in the storage unit 16 in association with the sensor ID.

For example, by using the artificial intelligence (AI) technology, the learning unit 12 learns the relationship between the plurality of measured values and the date-and-time information of the measured values for each sensor ID. Herein, examples of the AI technology are machine learning and reinforcement learning. Based on an algorithm to be used for learning and a use condition, the learning unit 12 may change the learning cycle. In addition, based on the relationship between the plurality of measured values and the date-and-time information of the measured values, the learning unit 12 may use a time-series analysis method, such as the Kalman filter or the autoregressive integrated moving average (ARIMA) model. An example of a case in which a learning model is created through machine learning will be described below. The learning unit 12 stores the created learning model in the learning model storage 16b in the storage unit 16.

By using the learning model stored in the learning model storage 16b, the prediction unit 13 predicts time information and a predicted measured value for each sensor ID. The time information indicates a future time from the current time point, and the predicted measured value is a measured value to be obtained at the time. For example, the prediction unit 13 acquires results such as a predicted measured value at a first time point and a predicted measured value at a second time point. How much the first time point and the second time point are temporally separated from each other depends on learning data. If the interval of a point of the learning data is 1 second, the interval of a point of a predicted value is 1 second. If the interval of a point of the learning data is 1 minute, the interval of a point of a predicted value is 1 minute. The prediction unit 13 stores the predicted measured value and the time information in a predicted measured value information storage 16c in the storage unit 16 in association with the sensor ID.

Based on the predicted measured value and the time information for each sensor ID stored in the predicted measured value information storage 16c in the storage unit 16, the alarm generation unit 14 determines whether any predicted measured value satisfies an alarm generation condition. Specifically, the alarm generation unit 14 determines whether any predicted measured value satisfies the alarm generation condition in an alarm recognition range that is a time range for determining whether any predicted measured value satisfies the alarm generation condition.

The alarm recognition range can be set to any given time range. For example, a time range based on the current time point or a time range based on a certain future time point can be set. The alarm generation condition is, for example, at least one of the predicted measured value exceeding an upper limit, the predicted measured value becoming less than a lower limit, a change value of the predicted measured value exceeding a change-value upper limit, and the change value of the predicted measured value becoming less than a change-value lower limit. The change value is, for example, change in the predicted measured value per predetermined duration.

Figure 3:
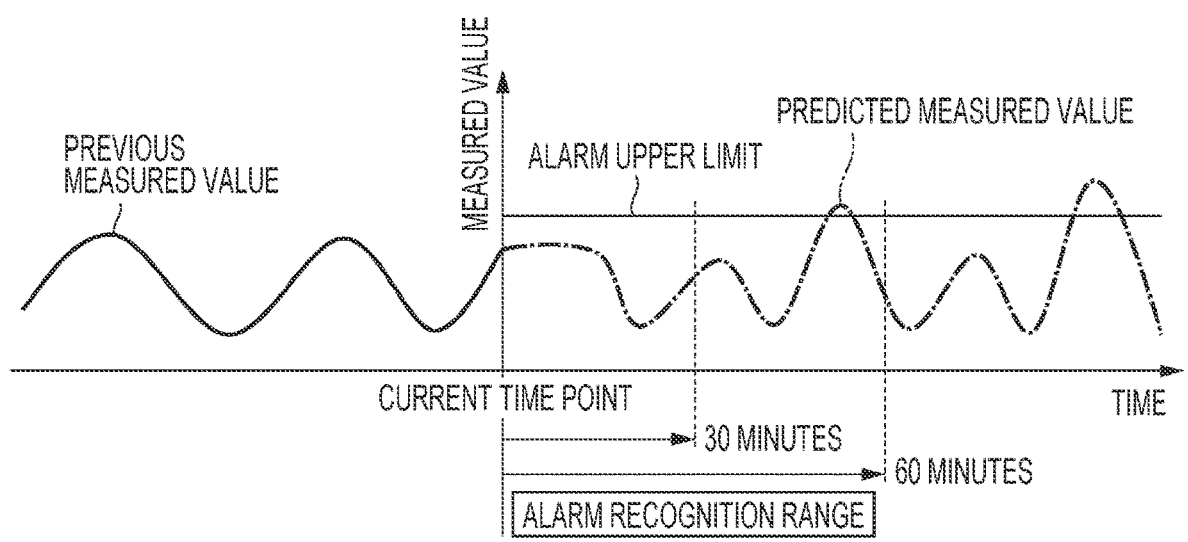
FIG. 3 illustrates an alarm recognition range in the embodiment of the present disclosure.

FIG. 3 illustrates the alarm recognition range in the embodiment of the present disclosure. In FIG. 3, the solid line indicates previously obtained measured values (previous measured values), and the dot-and-dashed line indicates predicted measured values that are to be obtained in the future from the current time point. In the example illustrated in FIG. 3, as alarm recognition ranges, "30 minutes from the current time point" and "60 minutes from the current time point" are illustrated. Herein, as the alarm generation condition, the predicted measured value exceeding the upper limit is set.

In the example illustrated in FIG. 3, in a case in which the alarm recognition range is set to "30 minutes from the current time point", there is no predicted measured value exceeding the alarm upper limit in the time range, and thus, the alarm generation unit 14 determines that there is no predicted measured value that satisfies the alarm generation condition. In contrast, in a case in which the alarm recognition range is set to "60 minutes from the current time point", there are predicted measured values exceeding the alarm upper limit in the time range, the alarm generation unit 14 determines that there are predicted measured values that satisfy the alarm generation condition.

The alarm generation unit 14 determines whether any predicted measured value for each sensor ID stored in the predicted measured value information storage 16c in the storage unit 16 satisfies the alarm generation condition in the alarm recognition range. If at least one predicted measured value for each sensor ID satisfies the alarm generation condition in the alarm recognition range, the alarm generation unit 14 generates an alarm. The alarm generation unit 14 outputs, to the display unit 18, alarm display information that is information for displaying the predicted measured value and a time at which the predicted measured value satisfies the alarm generation condition.

In addition, from a sensor installation information storage 16d in the storage unit 16, the alarm generation unit 14 acquires sensor installation position information indicating a sensor installation position stored in association with a sensor ID. The sensor installation position information herein is set in advance by a user. For example, as the sensor installation position information, a location name corresponding to the position can be used. The alarm generation unit 14 obtains a generation time indicating the time from the current time point to the time at which the predicted measured value satisfies the alarm generation condition. The alarm generation unit 14 outputs, to the display unit 18, alarm details information that is information for displaying details of an alarm. The alarm details information includes the sensor installation position information, the alarm generation condition, and the generation time.

If the alarm generation unit 14 determines that a predicted measured value satisfies the alarm generation condition, the creation unit 15 creates notification information for notifying a user that an alarm is generated. The creation unit 15 outputs the created notification information to the second communication unit 17-2. For example, the creation unit 15 creates an email addressed to a preset notification destination (e.g., the terminal apparatus 30), the email including the information for notifying a user that an alarm is generated. The creation unit 15 outputs the created email to the second communication unit 17-2.

The storage unit 16 includes the above-described measured value information storage 16a, the learning model storage 16b, the predicted measured value information storage 16c, and the sensor installation information storage 16d. The measured value information storage 16a, the learning model storage 16b, the predicted measured value information storage 16c, and the sensor installation information storage 16d may also be stored on the cloud or in a personal computer (PC). The storage unit 16 is implemented by a hard disk drive (HDD), a flash memory, a random access memory (RAM), a read-only memory (ROM), or the like.

The second communication unit 17-2 communicates with an external apparatus such as the terminal apparatus 30 connected to the network NW and transmits or receives data. Specifically, the second communication unit 17-2 is constituted by a wireless device that performs wireless communication by a wireless communication technique such as Wi-Fi (registered trademark) or Long-Term Evolution (LTE). The second communication unit 17-2 acquires the notification information output from the creation unit 15 and transmits the acquired notification information to the terminal apparatus 30. The notification information includes information for notifying a user that an alarm is generated. The information for notifying a user that an alarm is generated herein includes, for example, information on a channel in which the alarm is generated, an alarm level, an alarm type, a generation time, and the like.

The display unit 18 includes, for example, a liquid crystal display provided with a touchscreen. The display unit 18 acquires measured values and date-and-time information from the measured value information storage 16a in the storage unit 16, displays a trend chart indicating a relationship between the acquired measured values and the date-and-time information. In addition to the relationship between the measured values and the date-and-time information, the display unit 18 acquires the predicted measured value and the time information from the predicted measured value information storage 16c in the storage unit 16 and displays a trend chart indicating a relationship between the acquired predicted measured value and the time information. The display unit 18 further acquires the alarm display information output from the alarm generation unit 14, the alarm display information being information for displaying the predicted measured value and the time at which the predicted measured value satisfies the alarm generation condition, and, based on the acquired alarm display information, displays either one or both of the predicted measured value and the time at which the predicted measured value satisfies the alarm generation condition. Herein, a case in which the display unit 18 displays both the predicted measured value and the time at which the predicted measured value satisfies the alarm generation condition is described. In addition, the display unit 18 displays details of the alarm. Display examples of the trend chart, the predicted measured value and the alarm, and the details of the alarm will be described later.

The acquisition unit 11, the learning unit 12, the prediction unit 13, the alarm generation unit 14, and the creation unit 15 described above are, for example, implemented by a hardware processor such as a central processing unit (CPU) executing a program (software) stored in the storage unit 16. In addition, some or all of these functional units may be implemented by hardware (including circuitry) such as a large scale integration (LSI), an application specific integrated circuit (ASIC), a field-programmable gate array (FPGA), or a graphics processing unit (GPU) or may be implemented by software and hardware in collaboration. The program may be stored in advance in a storage device (storage device including a non-transitory storage medium) such as an HDD or a flash memory or may be stored in a detachable storage medium (non-transitory storage medium) such as a digital versatile disc (DVD) or a compact disc read-only memory (CD-ROM) and installed by the storage medium being attached to a drive apparatus.

Operations of Recorder System

Figure 4:
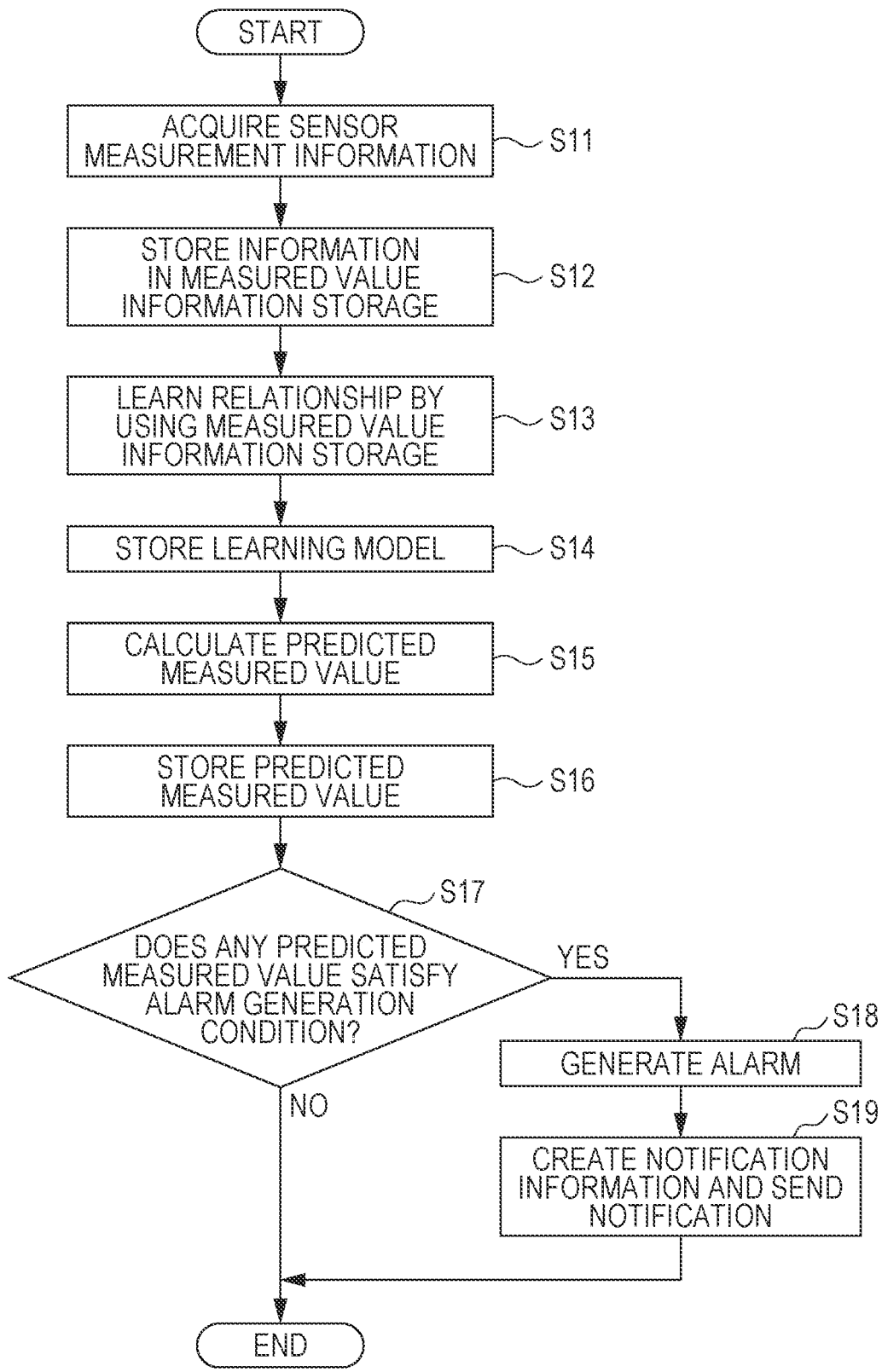
FIG. 4 is a flowchart illustrating an example of operations of the recorder system according to the embodiment of the present disclosure.

FIG. 4 is a flowchart illustrating an example of operations of the recorder system 1 according to the embodiment of the present disclosure. Note that operations of the alarm generation system 10 provided in the recorder system 1 will mainly be described below. The operations in the flowchart illustrated in FIG. 4 are, for example, repeatedly performed at fixed time intervals.

Step S11

In the alarm generation system 10, the first communication unit 17-1 receives measurement information (information including sensor IDs and measured values) transmitted from the sensors 20-1 to 20-n. The acquisition unit 11 acquires the measurement information received by the first communication unit 17-1. In addition, the acquisition unit 11 acquires information indicating measured values output from the sensors 20-n+1 to 20-o.

Step S12

In the alarm generation system 10, from the clock included in the alarm generation system 10, the acquisition unit 11 acquires date-and-time information of the measurement information. The acquisition unit 11 stores the measurement information (the information including the sensor IDs and the measured values) and the acquired date-and-time information in the measured value information storage 16a in the storage unit 16 in association with each other. From the clock included in the alarm generation system 10, the acquisition unit 11 acquires date-and-time information of the information indicating the measured values. The acquisition unit 11 stores the information indicating the measured values, the sensor IDs of the sensors that output the information indicating the measured values, and the acquired date-and-time information in the measured value information storage 16a in the storage unit 16 in association with one another.

Step S13

In the alarm generation system 10, by using the measured value information storage 16a in the storage unit 16, the learning unit 12 learns a relationship between a plurality of measured values and date-and-time information of the measured values for each sensor ID.

Step S14

In the alarm generation system 10, the learning unit 12 stores a learning model obtained through learning in the learning model storage 16b in the storage unit 16 in association with the sensor ID. For example, the "learning model" includes a predicted value, an inclination, and a noise parameter.

Step S15

In the alarm generation system 10, by using the learning model stored in the learning model storage 16b, the prediction unit 13 calculates a predicted measured value and time information for each sensor ID.

Step S16

In the alarm generation system 10, the prediction unit 13 stores the predicted measured value and the time information in the predicted measured value information storage 16c in the storage unit 16 in association with the sensor ID.

Step S17

In the alarm generation system 10, based on the predicted measured value and the time information for each sensor ID stored in the predicted measured value information storage 16c in the storage unit 16, the alarm generation unit 14 determines whether any predicted measured value satisfies an alarm generation condition. If no predicted measured value satisfies the alarm generation condition ("NO" in step S17), the process ends.

Step S18

In the alarm generation system 10, if a predicted measured value satisfies the alarm generation condition ("YES" in step S17), the alarm generation unit 14 generates an alarm.

Step S19

In the alarm generation system 10, the creation unit 15 creates notification information. Subsequently, the creation unit 15 outputs the created notification information to the second communication unit 17-2. The second communication unit 17-2 acquires the notification information output from the creation unit 15 and transmits the acquired notification information to the terminal apparatus 30.

The terminal apparatus 30 receives the notification information transmitted from the alarm generation system 10. Subsequently, the terminal apparatus 30 acquires the received notification information and displays information for notifying a user that an alarm is generated, the information being included in the acquired notification information.

Predicted Measured Value Display Examples

Figure 5:
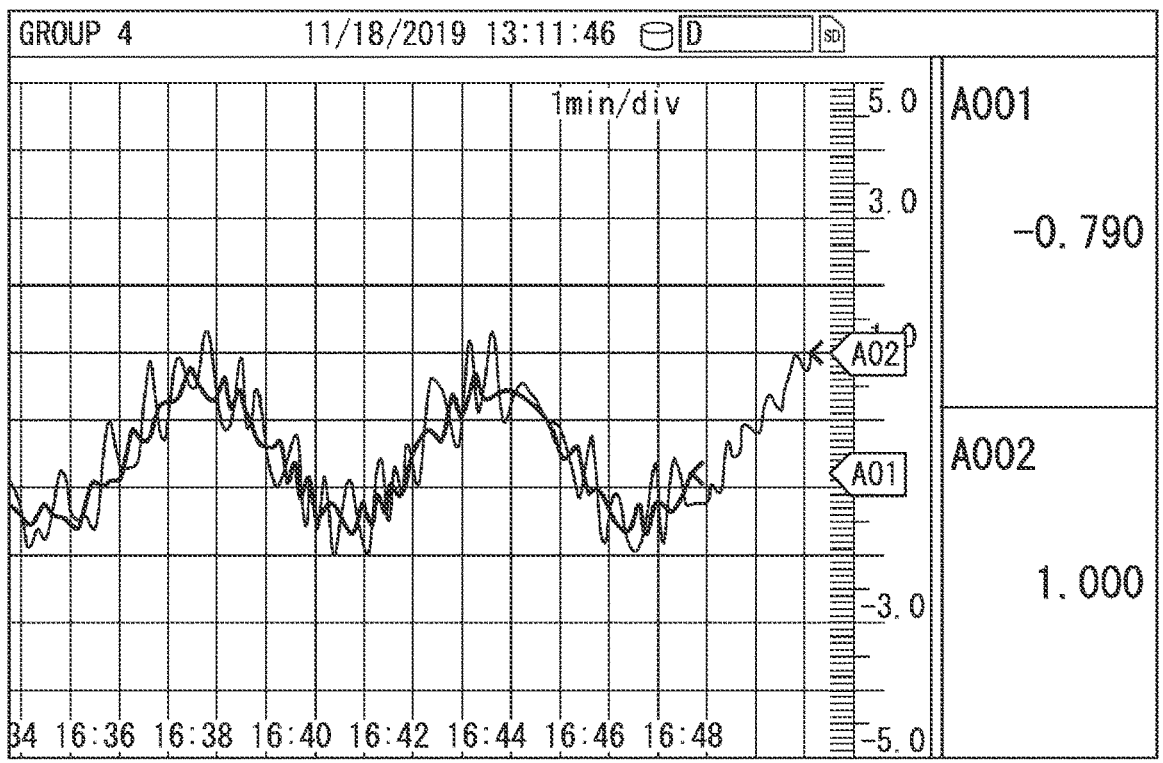
FIG. 5 illustrates a first display example of a predicted measured value in the embodiment of the present disclosure.

FIG. 5 illustrates a first display example of a predicted measured value in the embodiment of the present disclosure. In FIG. 5, the horizontal axis represents time, and the vertical axis represents measured value. By displaying a previous measured value in a channel A001 and displaying a predicted measured value in a channel A002, the display unit 18 displays the previous measured value and the predicted measured value in a superposed manner in a previous region. That is, in the example illustrated in FIG. 5, the previous measured value and the predicted measured value are displayed as different channel information. The display unit 18 displays the channel A001 and the channel A002 in colors different from each other and, for example, displays the predicted measured value in a lighter color than the previous measured value. The display unit 18 displays the previous measured value indicated by the arrow labeled as A01 being −0.790 and the predicted measured value indicated by the arrow labeled as A02 being 1.000.

Figure 6:
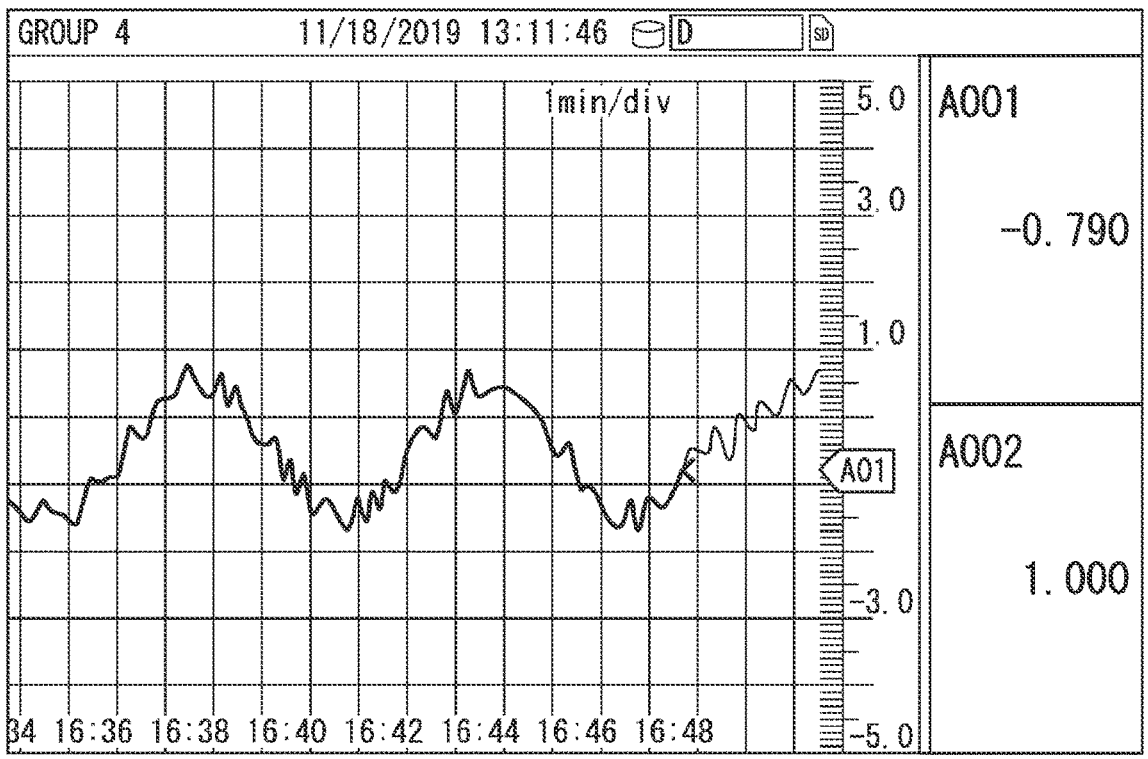
FIG. 6 illustrates a second display example of a predicted measured value in the embodiment of the present disclosure.

FIG. 6 illustrates a second display example of a predicted measured value in the embodiment of the present disclosure. In FIG. 6, the horizontal axis represents time, and the vertical axis represents measured value. The display unit 18 displays a previous measured value and a predicted measured value in a channel A001. By depicting the predicted measured value to be extended from the previous measured value, the display unit 18 displays the predicted measured value without superposing it on the previous measured value. In the example illustrated in FIG. 6, the predicted measured value is depicted in a different color, such as a lighter color than the previous measured value. The display unit 18 displays the previous measured value indicated by the arrow labeled as A01 being −0.790.

Figure 7:
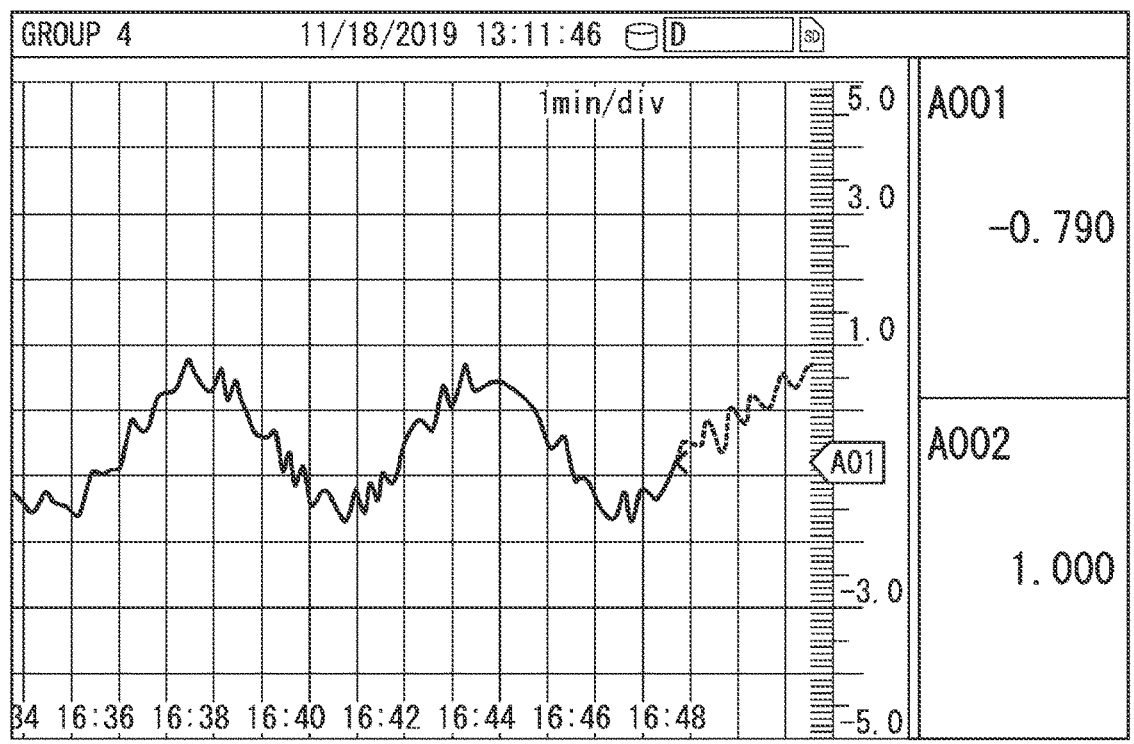
FIG. 7 illustrates a third display example of a predicted measured value in the embodiment of the present disclosure.

FIG. 7 illustrates a third display example of a predicted measured value in the embodiment of the present disclosure. In FIG. 7, the horizontal axis represents time, and the vertical axis represents measured value. As in the example illustrated in FIG. 6, the display unit 18 displays a previous measured value and a predicted measured value in a channel A001 and depicts the predicted measured value to be extended from the previous measured value. However, in the example illustrated in FIG. 7, the previous measured value is depicted as the solid line, and the predicted measured value is depicted as the broken line. The display unit 18 displays the previous measured value indicated by the arrow labeled as A01 being −0.790.

Figure 8:
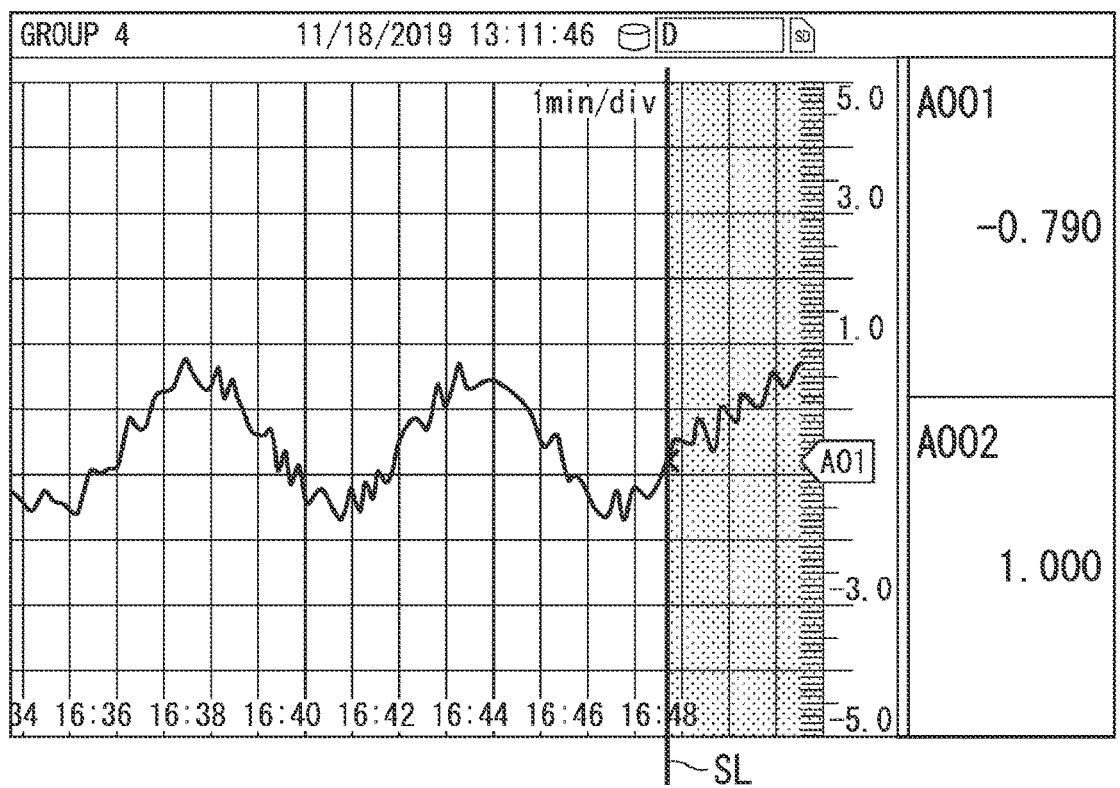
FIG. 8 illustrates a fourth display example of a predicted measured value in the embodiment of the present disclosure.

FIG. 8 illustrates a fourth display example of a predicted measured value in the embodiment of the present disclosure. In FIG. 8, the horizontal axis represents time, and the vertical axis represents measured value. As in the examples illustrated in FIGS. 6 and 7, the display unit 18 displays a previous measured value and a predicted measured value in a channel A001 and depicts the predicted measured value to be extended from the previous measured value. However, in the example illustrated in FIG. 8, between the previous measured value and the predicted measured value, a separating line SL is drawn, and the background color is different. The separating line SL herein may be omitted. The display unit 18 displays the predicted measured value indicated by the arrow labeled as A01 being −0.790.

Alarm Display Examples

Figure 9:
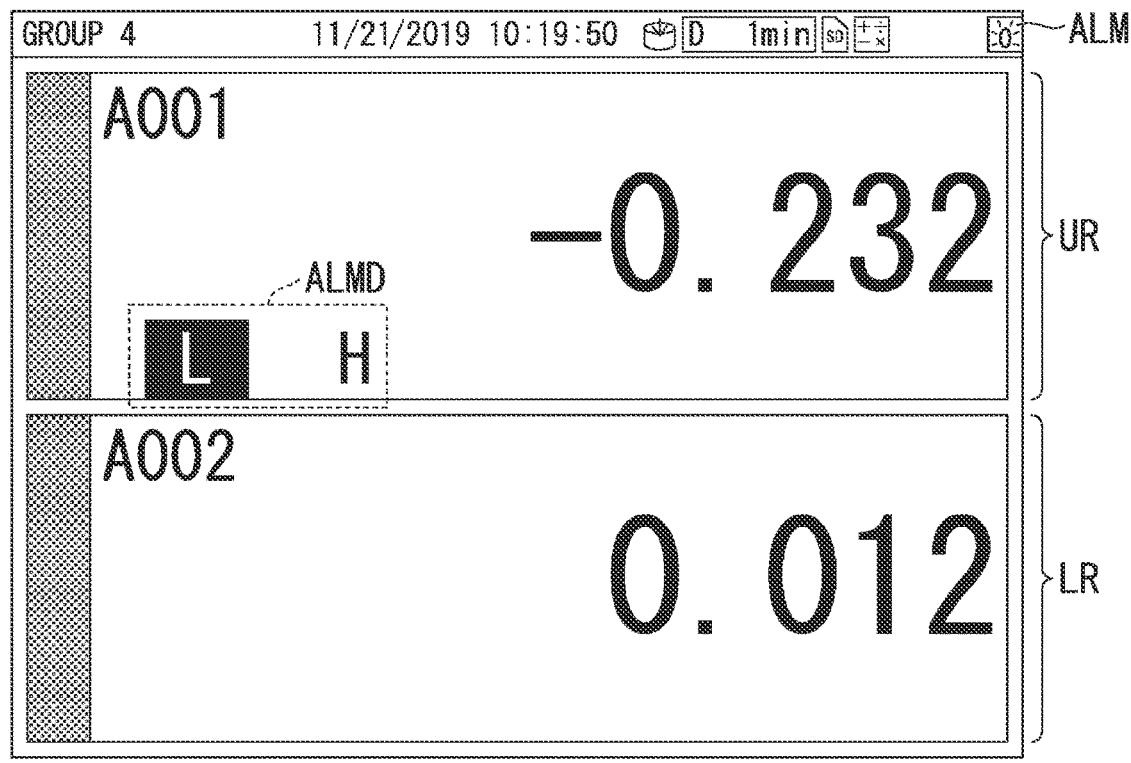
FIG. 9 illustrates a first display example of an alarm in the embodiment of the present disclosure.

FIG. 9 illustrates a first display example of an alarm in the embodiment of the present disclosure. In this example, the display unit 18 displays an alarm ALM, a current value (most recent measured value) in the channel A001, and a current value in the channel A002. The display unit 18 displays the current values by using numerical values (digital display). In the example illustrated in FIG. 9, the current value in the channel A001 is displayed in an upper region UR, and the current value in the channel A002 is displayed in a lower region LR.

If a current value in at least one channel satisfies the alarm generation condition, the display unit 18 lights the alarm ALM and also displays the current value in the channel in which the alarm generation condition is satisfied in a color different from that displayed if the current value does not satisfy the alarm generation condition. For example, if a current value in at least one channel satisfies the alarm generation condition, the display unit 18 lights the alarm ALM in red and also displays the current value in the channel in which the alarm generation condition is satisfied in red (color different from black, which is displayed if the current value does not satisfy the alarm generation condition).

The display unit 18 also displays an alarm display portion ALMD for displaying information indicating a cause of the alarm in the channel in which the alarm generation condition is satisfied. In the example illustrated in FIG. 9, in the upper region UR where the current value in the channel A001 is displayed, the alarm display portion ALMD is displayed. "L" displayed in the alarm display portion ALMD indicates that the cause of the alarm is the current value becoming less than an alarm lower limit, and "H" indicates that the cause of the alarm is the current value exceeding an alarm upper limit. If the cause of the alarm is the current value becoming less than the alarm lower limit, as illustrated in FIG. 9, the background of "L" displayed in the alarm display portion ALMD is, for example, red.

Furthermore, also if a future measured value satisfies the alarm generation condition, the display unit 18 lights the alarm ALM and also displays the current value in the channel in which the alarm generation condition is satisfied in a color different from that displayed if the current value does not satisfy the alarm generation condition. However, if a future measured value satisfies the alarm generation condition, the display unit 18 lights and displays the alarm ALM in a color (e.g., yellow) different from the color (e.g., red) displayed if the current value satisfies the alarm generation condition.

In addition, also if the future measured value satisfies the alarm generation condition, the display unit 18 displays the alarm display portion ALMD in the channel in which the alarm generation condition is satisfied. Depending on the cause of the alarm, the display unit 18 displays the background of "L" or "H" in the alarm display portion ALMD in, for example, yellow.

Figure 10:
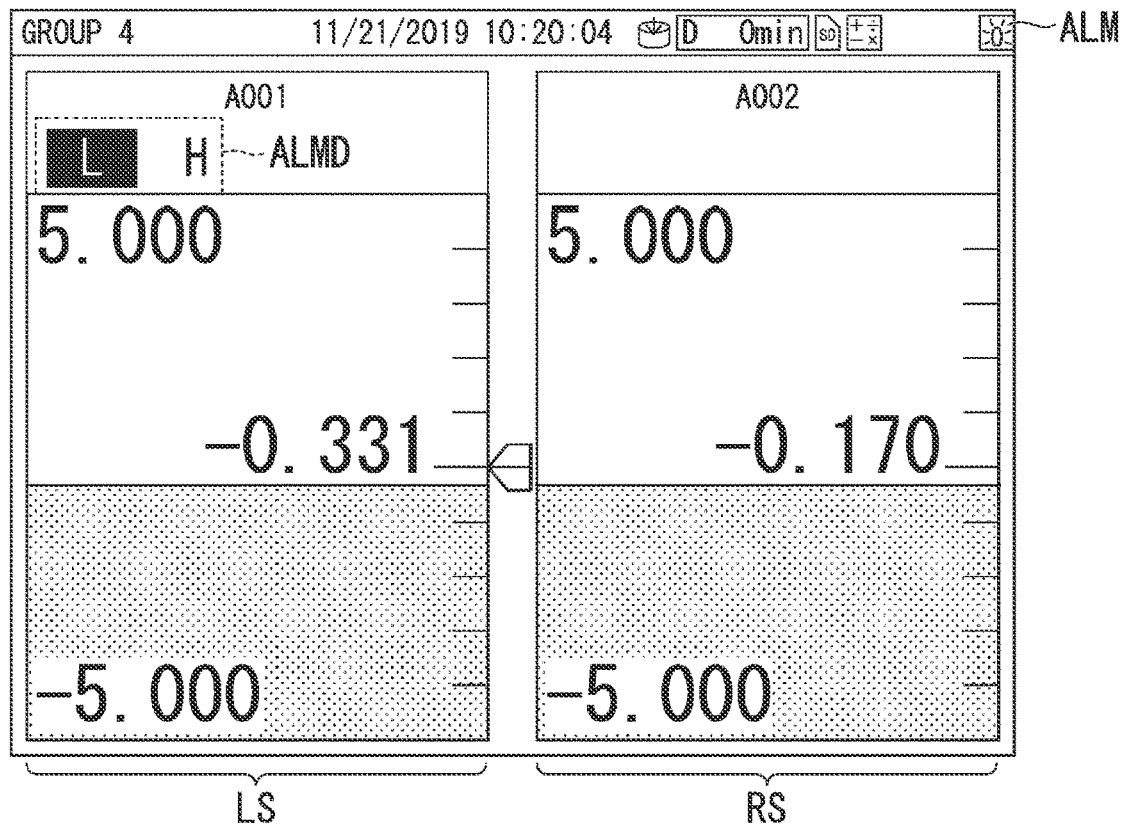
FIG. 10 illustrates a second display example of an alarm in the embodiment of the present disclosure.

FIG. 10 illustrates a second display example of an alarm in the embodiment of the present disclosure. In this example, as in the example illustrated in FIG. 9, the display unit 18 displays an alarm ALM, a current value in the channel A001, and a current value in the channel A002. Note that the display unit 18 displays each of the current values in the form of a bar graph. In the example illustrated in FIG. 10, the current value in the channel A001 is displayed in a left side LS, and the current value in the channel A002 is displayed in a right side RS.

As in the example illustrated in FIG. 9, if a current value in at least one channel satisfies the alarm generation condition, the display unit 18 lights the alarm ALM in, for example, red, and also displays the current value in the channel in which the alarm generation condition is satisfied in, for example, red. In addition, as in the example illustrated in FIG. 9, the display unit 18 displays an alarm display portion ALMD for displaying information indicating a cause of the alarm in the channel in which the alarm generation condition is satisfied and displays the background of "L" or "H" in, for example, red.

Furthermore, as in the example illustrated in FIG. 9, if a future measured value satisfies the alarm generation condition, the display unit 18 lights the alarm ALM in, for example, yellow, and also displays the current value in the channel in which the alarm generation condition is satisfied in, for example, yellow. In addition, as in the example illustrated in FIG. 9, the display unit 18 displays the alarm display portion ALMD for displaying information indicating the cause of the alarm in the channel in which the alarm generation condition is satisfied and displays the background of "L" or "H" in, for example, yellow.

Figures 11, 12:
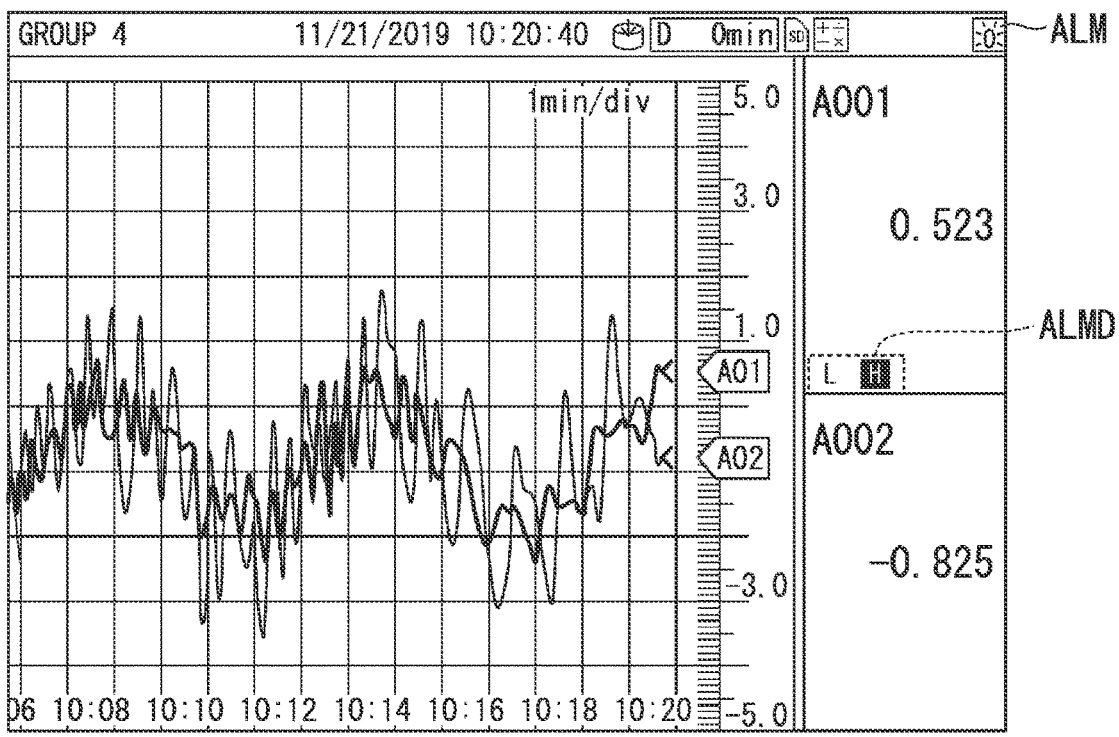
FIG. 11 illustrates a third display example of an alarm in the embodiment of the present disclosure.
FIG. 12 illustrates a fourth display example of an alarm in the embodiment of the present disclosure.

FIG. 11 illustrates a third display example of an alarm in the embodiment of the present disclosure. In this example, the display unit 18 displays an alarm ALM and current values in channels. In the example illustrated in FIG. 11, the display unit 18 displays an overview of the current values in channels in the form of a table. In the example illustrated in FIG. 11, a current value in a channel is displayed in any of thirty fields in total, which are six in height and five in width. In the example illustrated in FIG. 11, a current value in the channel A001 is displayed in a field where R05 intersects with C03, and a current value in the channel A002 is displayed in a field where R05 intersects with C04.

As in the examples illustrated in FIGS. 9 and 10, if a current value in at least one channel satisfies the alarm generation condition, the display unit 18 lights the alarm ALM in, for example, red, and also displays the background of the channel in which the alarm generation condition is satisfied in, for example, red. In addition, as in the examples illustrated in FIGS. 9 and 10, if a future measured value in at least one channel satisfies the alarm generation condition, the display unit 18 lights the alarm ALM in, for example, yellow, and also displays the background of the channel in which the alarm generation condition is satisfied in, for example, yellow. By glancing at the displayed overview, a user is able to check whether a current value or a future measured value satisfies the alarm generation condition in each channel.

FIG. 12 illustrates a fourth display example of an alarm in the embodiment of the present disclosure. In FIG. 12, the horizontal axis represents time, and the vertical axis represents measured value. The display unit 18 displays an alarm ALM and also displays, as in the example illustrated in FIG. 5, a previous measured value in a channel A001 in the form of a trend chart and a predicted measured value in a channel A002 in the form of a trend chart. The display unit 18 displays the channel A001 and the channel A002 in colors different from each other.

In the example illustrated in FIG. 12, the display unit 18 displays the predicted measured value indicated by the arrow labeled as A01 being 0.523 and the previous measured value indicated by the arrow labeled as A02 being −0.825. Since the predicted measured value indicated by the arrow labeled as A01 satisfies the alarm generation condition, the display unit 18 lights the alarm ALM and displays the predicted measured value in a color different from that displayed if current measured value satisfies alarm generation condition. For example, if the predicted measured value satisfies the alarm generation condition, the display unit 18 lights the alarm ALM in yellow and also displays the predicted measured value in a color, for example, yellow, different from red, which is the color displayed if the current measured value satisfies alarm generation condition.

Furthermore, as in the examples illustrated in FIGS. 9 and 10, the display unit 18 displays an alarm display portion ALMD for displaying information indicating a cause of the alarm in the channel in which the alarm generation condition is satisfied. In addition, if a current value satisfies the alarm generation condition, the display unit 18 displays the background of "L" or "H" of the alarm display portion ALMD in, for example, red, and, if a future measured value satisfies the alarm generation condition, displays the background of "L" or "H" of the alarm display portion ALMD in, for example, yellow.

Alarm Details Information Display Examples

FIG. 13 illustrates a display example of alarm details information in the embodiment of the present disclosure. As the alarm details information, information indicating whether an alarm is on or off, information indicating a sensor installation position, information indicating an alarm generation condition, and information indicating a generation time are displayed in association with one another.

In the example illustrated in FIG. 13, the display unit 18 displays alarm "ON", the sensor installation position "Factory A—thermostat oven 00453", the alarm generation condition "exceeding upper limit", and the generation time "in 15 minutes" in association with one another. The display unit 18 displays alarm "ON", the sensor installation position "Factory C—thermostat oven 02450", the alarm generation condition "exceeding change-value upper limit", and the generation time "in 3 minutes" in association with one another. The display unit 18 displays alarm "ON", the sensor installation position "Factory A—thermostat oven 00245", the alarm generation condition "exceeding upper limit", and the generation time "in 10 minutes" in association with one another. The display unit 18 displays alarm "ON", the sensor installation position "Factory B—thermostat oven 11945", the alarm generation condition "becoming less than lower limit", and the generation time "in 35 minutes" in association with one another.

As described above, the alarm generation system 10 according to the embodiment includes the acquisition unit 11, the learning unit 12, the prediction unit 13, and the alarm generation unit 14. The acquisition unit 11 acquires measured values obtained from the sensors 20-1 to 20-$n$. Through learning of the measured values acquired by the acquisition unit 11, the learning unit 12 generates a learning model. By using the learning model generated by the learning unit 12, the prediction unit 13 obtains a predicted measured value that is a measured value to be obtained in the future from the current time point. If the predicted measured value obtained by the prediction unit 13 satisfies an alarm generation condition, the alarm generation unit 14 generates an alarm.

The above configuration enables the alarm generation system 10 to obtain the measured value to be obtained in the future from the current time point. In addition, the above configuration enables the alarm generation system 10 to generate an alarm if the predicted measured value satisfies the alarm generation condition. This can notify a user that an abnormality may occur in the future.

The alarm generation system 10 according to the embodiment further includes the creation unit 15 that, if the predicted measured value obtained by the prediction unit 13 satisfies the alarm generation condition, creates information indicating that an alarm is generated. This configuration enables the alarm generation system 10 to create information such as an email indicating that an alarm is generated. By transmitting the created information for giving an alarm, the alarm generation system 10 can notify a user at a distant location that an alarm is generated, and thus can notify the user that a danger may occur.

The alarm generation system 10 according to the embodiment further includes the display unit 18 that displays at least one of the predicted measured value obtained by the prediction unit 13 and a time at which the predicted measured value satisfies the alarm generation condition. This configuration enables the alarm generation system 10 to display at least one of the predicted measured value and the time at which the predicted measured value satisfies the alarm generation condition, and thus, the alarm generation system 10 can notify a user in advance that a danger may occur. This configuration also enables the alarm generation system 10 to notify the user of the time at which the predicted measured value satisfies the alarm generation condition.

According to the alarm generation system 10 according to the embodiment, the prediction unit 13 further obtains information indicating the probability of generating an alarm by using the learning model generated by the learning unit 12, and the display unit 18 further displays the information obtained by the prediction unit 13, the information indicating the probability of generating an alarm. This configuration enables the alarm generation system 10 to display the probability of generating an alarm, and thus, the alarm generation system 10 can notify a user in advance of the probability that a danger occurs.

According to the alarm generation system 10 according to the embodiment, the alarm generation condition is at least one of the predicted measured value exceeding an upper limit, the predicted measured value becoming less than a lower limit, a change value of the predicted measured value exceeding a change-value upper limit, and the change value of the predicted measured value becoming less than a change-value lower limit. This configuration enables the alarm generation system 10 to determine whether or not an alarm is to be generated based on at least one of the predicted measured value exceeding an upper limit, the predicted measured value becoming less than a lower limit, a change value of the predicted measured value exceeding a change-value upper limit, and the change value of the predicted measured value becoming less than a change-value lower limit.

The embodiment of the present disclosure has been described above in detail with reference to the drawings. However, specific configurations are not limited to the embodiment, and design modifications or the like may be made without departing from the gist of the present disclosure. For example, the above embodiment has described a case in which the alarm generation system 10 transmits notification information to the single terminal apparatus 30. However, the present disclosure is not limited to this example. The alarm generation system 10 may transmit notification information to, for example, a plurality of terminal apparatuses 30.

The above embodiment has described a case in which the alarm generation system 10 acquires date-and-time information of measurement information transmitted from each of the sensors 20-1 to 20-*n*. However, the present disclosure is not limited to this example. For example, each of the sensors 20-1 to 20-*n* may acquire the date-and-time information at the measurement of a measurement target and transmit the measurement information including the acquired date-and-time information to the alarm generation system 10.

The above embodiment has described a case in which a previous measured value and a predicted measured value are displayed as different channel information and a case in which the predicted measured value is depicted to be extended from the previous measured value as a display example of the predicted measured value. However, the present disclosure is not limited to this example. For example, the display unit 18 may display the predicted measured value in a blinking manner. In addition, the display unit 18 may display animation by depicting the predicted measured value in a light color and then gradually extending a dark line.

The above embodiment has described a case in which, if alarm details information is displayed, sensor installation position information, an alarm generation condition, and a generation time are displayed in association with one another. However, the present disclosure is not limited to this example. For example, if the alarm details information is displayed, the display unit 18 may display, in addition to the sensor installation position information, the alarm generation condition, and the generation time, the probability of generating an alarm in association with one another. In this case, when predicting a predicted measured value that is a single measured value or a plurality of measured values to be obtained in the future from the current time point, and time information indicating the time at which the predicted measured value is to be obtained, for each sensor ID, the prediction unit 13 predicts the probability of generating an alarm. The prediction unit 13 creates alarm display information that is information for displaying a relationship between the predicted measured value, the probability of generating an alarm, and the time information, and outputs the created alarm display information to the display unit 18.

The above embodiment has described a case in which the creation unit 15 creates an email addressed to a preset notification destination, the email including information for notifying a user that an alarm is generated. However, the present disclosure is not limited to this example. For example, the creation unit 15 may create an email addressed to a preset notification destination, the email including, in addition to the information for notifying a user that an alarm is generated, information indicating a generation time. The creation unit 15 may also create an email addressed to a preset notification destination, the email including, in addition to the information for notifying a user that an alarm is generated and the information indicating the generation time, information indicating the probability of generating an alarm.

The above embodiment has described a case in which the recorder system 1 includes the alarm generation system 10 and the sensors 20-1 to 20-*n*. However, the present disclosure is not limited to this example. For example, the display unit 18 included in the alarm generation system 10 may be configured as an apparatus other than the alarm generation system 10.

In a case in which the display unit 18 included in the alarm generation system 10 is configured as an apparatus other than the alarm generation system 10, the alarm generation system 10 not including the display unit 18 may be configured on the cloud. In this case, communication with the alarm generation system 10 not including the display unit 18 may be performed by using a gateway or each of the sensors 20-1 to 20-n. In addition, in this case, the display unit 18 may be included in a terminal apparatus such as a personal computer or a smartphone.

Figure 14:
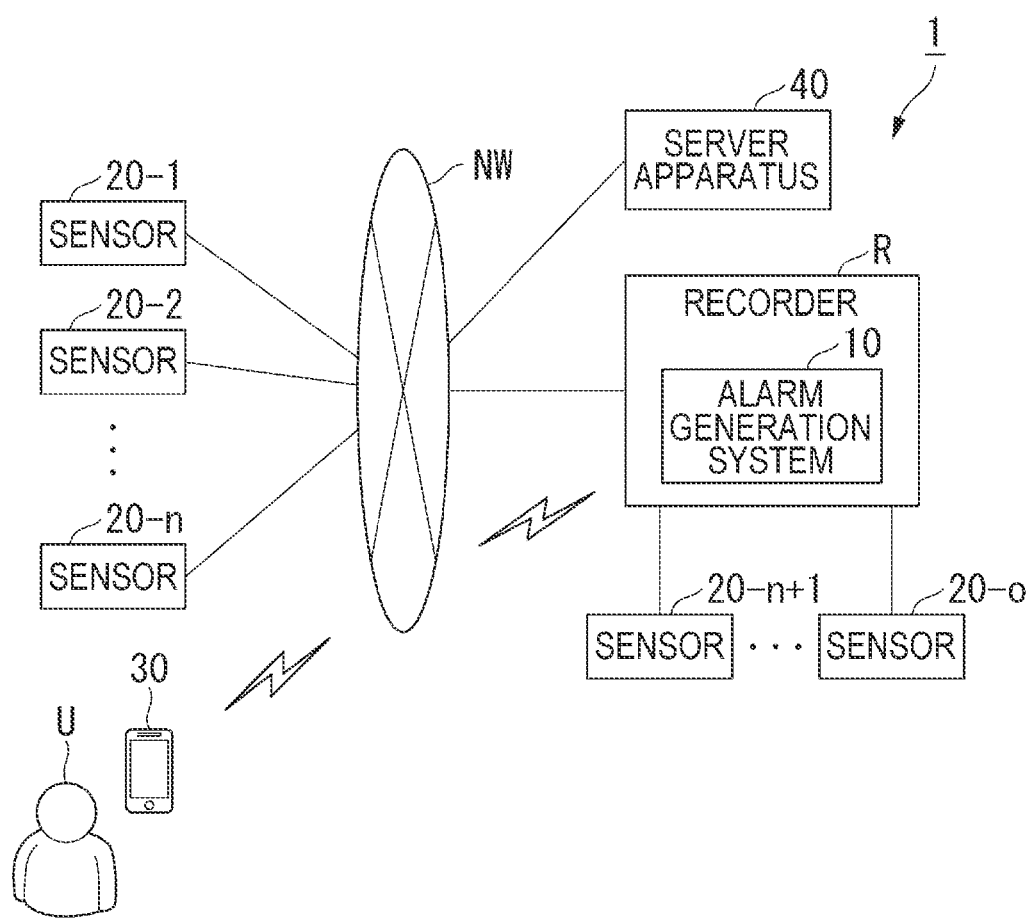
FIG. 14 is a block diagram illustrating an overall configuration of the recorder system according to a modification of the present disclosure.

The above embodiment has described a case in which the alarm generation system 10 is provided in the recorder R. However, some of the functions of the alarm generation system 10 may also be implemented by an apparatus other than the recorder R. FIG. 14 is a block diagram illustrating an overall configuration of the recorder system 1 according to a modification of the present disclosure. As illustrated in FIG. 14, the recorder system 1 according to this modification includes a server apparatus 40 that is connected to the network NW and that implements some of the functions of the alarm generation system 10. The server apparatus 40 is communicably connected to the recorder R (the alarm generation system 10).

For example, the server apparatus 40 may be configured to implement the functions of the learning unit 12 and the learning model storage 16b (part of the storage unit 16) of the alarm generation system 10. In a case of this configuration, the learning unit 12 implemented by the server apparatus 40 may acquire, from the alarm generation system 10, information on a plurality of measured values, and, based on the acquired information on the plurality of measured values, learn a relationship between the plurality of measured values and date-and-time information of the measured values for each sensor ID.

Alternatively, for example, the server apparatus 40 may be configured to implement the functions of the prediction unit 13 and the predicted measured value information storage 16c, in addition to the functions of the learning unit 12 and the learning model storage 16b of the alarm generation system 10. In a case of this configuration, the prediction unit 13 implemented by the server apparatus 40 predicts, by using the learning model stored in the learning model storage 16b, for each sensor ID, a predicted measured value that is a single measured value or a plurality of measured values to be obtained after a predetermined period, that is, in the future from the current time point, and a generation time that is the time at which the predicted measured value is to be obtained. In addition, the server apparatus 40 transmits the prediction result to the alarm generation system 10.

Further alternatively, the server apparatus 40 may be configured to implement the function of the alarm generation unit 14 in addition to the functions of the learning unit 12, the prediction unit 13, the learning model storage 16b, and the predicted measured value information storage 16c of the alarm generation system 10. In a case of this configuration, the server apparatus 40 transmits a determination result as to whether a predicted measured value satisfies an alarm generation condition to the alarm generation system 10.

To display any of the trend charts (the trend charts of the previous measured value and the predicted measured value) illustrated in FIGS. 5 to 8, the display unit 18 may display it as follows.

The display unit 18 may display a line indicating either one of the upper limit of the predicted measured value and the lower limit of the predicted measured value or lines indicating both of them, and, if the predicted measured value exceeds the upper limit of the predicted measured value or if the predicted measured value becomes less than the lower limit of the predicted measured value, the display unit 18 may change the color of the displayed line or lines.

The display unit 18 may display the predicted measured value satisfying the alarm generation condition in a color different from the color of a predicted measured value not satisfying the alarm generation condition, or may display the predicted measured value satisfying the alarm generation condition in a blinking manner.

At a portion of the predicted measured value satisfying the alarm generation condition, the display unit 18 display a symbol (mark) indicating that an alarm is generated.

The display unit 18 may display the background of the portion of the predicted measured value satisfying the alarm generation condition in a color different from the color of the background of a portion of the predicted measured value not satisfying the alarm generation condition.

If the above alarm generation system 10 determines that the predicted measured value satisfies the alarm generation condition, based on a determination result as to whether the measured value corresponding to the predicted measured value satisfies the alarm generation condition, the learning unit 12 may update the learning model. In addition, based on a determination result as to whether the predicted measured value satisfies the alarm generation condition and the determination result as to whether the measured value corresponding to the predicted measured value satisfies the alarm generation condition, the learning unit 12 may update the learning model.

A computer program for implementing the functions of the above alarm generation system 10 may be recorded on a computer-readable recording medium, and the program recorded on the recording medium may be read and executed by a computer system. Note that the "computer system" herein may include an operating system (OS) and hardware such as a periphery device. In addition, the "computer-readable recording medium" refers to a storage device such as a rewritable non-volatile memory such as a flexible disc, a magneto-optical disc, a ROM, or a flash memory, a transportable medium such as a DVD, or a hard disk built in the computer system.

The "computer-readable recording medium" further includes a computer-readable recording medium storing a program for a fixed period, such as a volatile memory (e.g., dynamic random access memory (DRAM)) in a computer system serving as a server or a client if the program is transmitted via a network such as the Internet or a communication line such as a telephone line.

In addition, the above program may be transmitted from a computer system storing the program in a storage device or the like to another computer system via a transmission medium or via a transmission wave in a transmission medium. The "transmission medium" for transmitting the program herein refers to a medium having a function of transmitting information such as a network (communication network) such as the Internet or a communication line such as a telephone line.

In addition, the program may implement some of the above functions. Furthermore, the program may implement the above functions in combination with a program that is already recorded in a computer system, that is, a so-called differential file (differential program).

Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

What is claimed is:

1. An alarm generation system comprising:
    an acquisition unit that acquires a measured value obtained by a sensor;
    a learning unit that generates a learning model through learning of the measured value acquired by the acquisition unit;
    a prediction unit that obtains, by using the learning model generated by the learning unit, a predicted measured value that is a measured value to be obtained in a future from a current time point; and
    an alarm generation unit that generates an alarm when the predicted measured value obtained by the prediction unit satisfies an alarm generation condition,
    wherein the learning unit learns the measured value using machine learning to generate the learning model.

2. The alarm generation system according to claim 1, further comprising:
    a creation unit that, when the predicted measured value obtained by the prediction unit satisfies the alarm generation condition, creates information for notifying a user that the alarm is generated.

3. The alarm generation system according to claim 1, further comprising:
    a display unit that displays at least one of the predicted measured value obtained by the prediction unit or a time at which the predicted measured value satisfies the alarm generation condition.

4. The alarm generation system according to claim 3,
    wherein the prediction unit further obtains information indicating a probability of generating the alarm by using the learning model generated by the learning unit, and
    wherein the display unit further displays information indicating the probability of generating the alarm obtained by the prediction unit.

5. The alarm generation system according to claim 1,
    wherein the alarm generation condition is at least one of the predicted measured value exceeding an upper limit, the predicted measured value becoming less than a lower limit, a change value of the predicted measured value exceeding a change-value upper limit, or the change value of the predicted measured value becoming less than a change-value lower limit.

6. The alarm generation system according to claim 1,
    wherein the learning unit learns a relationship between a plurality of the measured values and date-and-time information of the respective measured values.

7. The alarm generation system according to claim 1,
    wherein the alarm generation unit uses a time range of an alarm recognition range starting from the current time point and determines whether there is any of the predicted measured value which satisfies the alarm generation condition in the alarm recognition range in the future.

8. The alarm generation method according to claim 1,
    wherein the generating the alarm step further comprises using a time range of an alarm recognition range starting from the current time point and determines whether there is any of the predicted measured value which satisfies the alarm generation condition in the alarm recognition range in the future.

9. An alarm generation method performed by an alarm generation system, the method comprising:
    acquiring a measured value obtained by a sensor;
    generating a learning model through learning of the acquired measured value;
    obtaining, by using the generated learning model, a predicted measured value that is a measured value to be obtained in a future after a current time point; and
    generating an alarm when the predicted measured value satisfies an alarm generation condition,
    wherein the acquired measured value is learned using machine learning to generate the learning model.

10. The alarm generation method according to claim 9, further comprising:
    when the predicted measured value satisfies the alarm generation condition, creating information for notifying a user that the alarm is generated.

11. The alarm generation method according to claim 9, further comprising:
    displaying at least one of the predicted measured value or a time at which the predicted measured value satisfies the alarm generation condition.

12. The alarm generation method according to claim 11,
    wherein the obtaining step further obtains information indicating a probability of generating the alarm by using the learning model, and
    wherein the display step displays information indicating the probability of generating the alarm.

13. The alarm generation method according to claim 9,
    wherein the alarm generation condition is at least one of the predicted measured value exceeding an upper limit, the predicted measured value becoming less than a lower limit, a change value of the predicted measured value exceeding a change-value upper limit, or the change value of the predicted measured value becoming less than a change-value lower limit.

14. The alarm generation method according to claim 9,
    wherein the generating the learning model step further comprising learning a relationship between a plurality of the measured values and date-and-time information of the respective measured values.

15. An alarm generation system comprising:
    an acquisition unit that acquires a measured value obtained by a sensor;
    a learning unit that generates a learning model through learning of the measured value acquired by the acquisition unit;
    a prediction unit that obtains, by using the learning model generated by the learning unit, a predicted measured value that is a measured value to be obtained in a future from a current time point;
    an alarm generation unit that generates an alarm when the predicted measured value obtained by the prediction unit satisfies an alarm generation condition; and
    a creation unit that, when the predicted measured value obtained by the prediction unit satisfies the alarm generation condition, creates information for notifying a user that the alarm is generated.

16. The alarm generation system according to claim 15, further comprising:

a display unit that displays at least one of the predicted measured value obtained by the prediction unit or a time at which the predicted measured value satisfies the alarm generation condition.

17. The alarm generation system according to claim 16, wherein the prediction unit further obtains information indicating a probability of generating the alarm by using the learning model generated by the learning unit, and wherein the display unit further displays information indicating the probability of generating the alarm obtained by the prediction unit.

18. The alarm generation system according to claim 15, wherein the alarm generation condition is at least one of the predicted measured value exceeding an upper limit, the predicted measured value becoming less than a lower limit, a change value of the predicted measured value exceeding a change-value upper limit, or the change value of the predicted measured value becoming less than a change-value lower limit.

19. The alarm generation system according to claim 15, wherein the learning unit learns a relationship between a plurality of the measured values and date-and-time information of the respective measured values.

20. The alarm generation system according to claim 15, wherein the alarm generation unit uses a time range of an alarm recognition range starting from the current time point and determines whether there is any of the predicted measured value which satisfies the alarm generation condition in the alarm recognition range in the future.

* * * * *